United States Patent
N et al.

(10) Patent No.: US 10,999,274 B2
(45) Date of Patent: May 4, 2021

(54) DETERMINING A DEVICE PROPERTY

(71) Applicant: Hewlett Packard Enterprise Development LP, Houston, TX (US)

(72) Inventors: Sivasankaran N, Bangalore (IN); Ramlakhan Patel, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 310 days.

(21) Appl. No.: 15/884,877

(22) Filed: Jan. 31, 2018

(65) Prior Publication Data

US 2019/0238537 A1 Aug. 1, 2019

(51) Int. Cl.
*H04L 29/06* (2006.01)
*H04L 9/32* (2006.01)
*H04L 12/26* (2006.01)

(52) U.S. Cl.
CPC ........ *H04L 63/0876* (2013.01); *H04L 9/3242* (2013.01); *H04L 43/065* (2013.01); *H04L 63/102* (2013.01); *H04L 63/108* (2013.01)

(58) Field of Classification Search
CPC . H04L 63/0876; H04L 63/108; H04L 63/102; H04L 9/3242; H04L 43/065
See application file for complete search history.

(56) References Cited

U.S. PATENT DOCUMENTS

| | | | |
|---|---|---|---|
| 7,813,354 B1 | 10/2010 | Norris | |
| 8,693,473 B2 | 4/2014 | Harjanto et al. | |
| 8,887,237 B2 | 11/2014 | Janakiraman | |
| 8,990,891 B1* | 3/2015 | Chickering | G06F 21/74 726/3 |
| 9,258,305 B2 | 2/2016 | Higuchi et al. | |
| 2011/0238855 A1* | 9/2011 | Korsunsky | G06F 21/56 709/231 |
| 2014/0068030 A1* | 3/2014 | Chambers | H04L 41/0809 709/220 |
| 2014/0269299 A1* | 9/2014 | Koornstra | H04L 63/1416 370/235 |
| 2016/0196344 A1* | 7/2016 | Cremer | G06F 16/639 707/758 |
| 2016/0234205 A1* | 8/2016 | An | H04W 12/08 |
| 2019/0238537 A1 | 8/2019 | N et al. | |

FOREIGN PATENT DOCUMENTS

| | | |
|---|---|---|
| CN | 103761791 | 4/2014 |
| CN | 106302397 A | 1/2017 |
| CN | 106407768 | 2/2017 |
| EP | 3522487 A1 | 8/2019 |
| KR | 20090111466 A | 10/2009 |

OTHER PUBLICATIONS

Thakkar, D., Byod Applications and MDM for Enterprises: The Biometric Way, (Research Paper), May 12, 2017, 5 Pgs.

* cited by examiner

*Primary Examiner* — Kevin Bechtel
*Assistant Examiner* — Hamid Talaminaei

(57) ABSTRACT

An example method comprising detecting that an unidentified client device joins a network, retrieving information related to a device property of the unidentified client device from network traffic to and/or from the unidentified client device, sending a query based on the information to a fingerprinting server, and receiving the device property of the unidentified client device in response to the query.

20 Claims, 3 Drawing Sheets

DETERMINING A DEVICE PROPERTY

BACKGROUND

In some networks it may be desirable to enforce network access policies for each device based on information about the devices. Device fingerprinting is a technique that aids in providing more information about devices connected to a network, such as for example the operating system in the device, the device type and the device manufacturer.

Information about devices can be used to apply policies to the devices. For example, devices such as cameras may in some networks be permitted to access specific servers to upload live camera feeds, and be denied other access. Devices such as temperature sensors with weak or no security protocols may for example be grouped within a guest virtual LAN (VLAN) with limited access to the network, other networks or resources on the network.

BRIEF DESCRIPTION OF DRAWINGS

Examples will now be described, by way of non-limiting example, with reference to the accompanying drawings, in which.

DETAILED DESCRIPTION

In some networks, a network switch may receive communications sent by or to a device associated (e.g. connected to) the network switch, and switch those communications appropriately, such as for example forwarding the communications to the device or to another network node. The network switch may also forward these communications to a fingerprinting server, which may analyse the communications and derive device properties, such as for example device type, device manufacturer, device operating system, software installed on the device, version of operating system or software, and/or any other information describing the device or its capabilities. The network switch may forward the communications for example using port mirroring. However, forwarding these communications to the fingerprinting server may use considerable network resources such as bandwidth, particularly where there is a large number of devices accessing the network and requiring fingerprinting.

Figure 1:
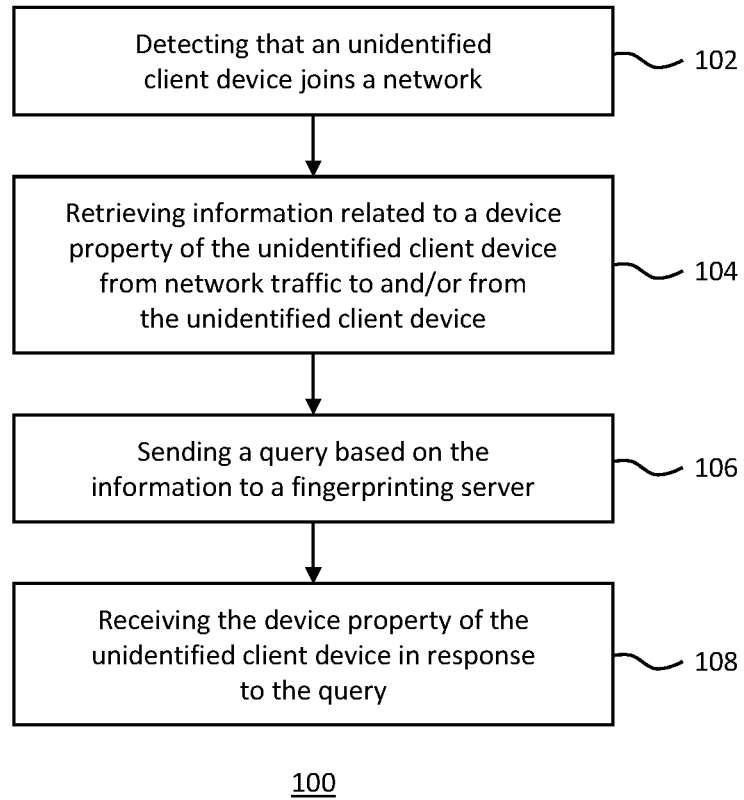
FIG. 1 is a flow chart of an example of a method in a network switching device.

FIG. 1 shows a flow chart of an example of a method 100 in a network switching device. The method 100 comprises, in block 102, detecting that an unidentified client device joins a network. The unidentified client device may be for example a client device that has not previously accessed the network (e.g. through any node or through the switch), or has not done so for some time. The network switching device may identify that the client device is an unidentified device by, for example, determining that the Media Access Control (MAC) address of the device has not previously been seen by the switch or the network, or has not been seen for some time.

Block 104 of the method 100 comprises retrieving information related to a device property of the unidentified client device from network traffic to and/or from the unidentified client device. The information may be information that can be used by a fingerprinting server to identify the device property. For example, the information contains device fingerprints that can be used to identify the device property, such as device type (e.g. laptop, access point, switch, printer), device operating system (e.g. Windows, Linux, Mac OS), operating system version, and/or any other property. In some examples, the information may be a copy of communications such as packets that are sent by or to the unidentified client device, and in some examples may be information extracted from such communications. Examples of information extracted from communications include a Dynamic Host Configuration Protocol (DHCP) Option Type-Length-Value (TLV), a DHCP Request, a HTTP header user agent string, a HTTP packet, a TCP SYN-ACK message header and/or a Link Layer Discovery Protocol (LLDP) frames. More specifically, in some examples, the information may include a of DHCP Option TLV 55 and 60 in a DHCP request, and LLDP Organizationally unique identifier (OUI) and MAC OUI in LLDP packets.

Block 106 of the method 100 comprises sending a query based on the information to a fingerprinting server. The query can take any suitable form such as for example a Representational State Transfer (REST) query. The query can contain the information retrieved in block 104 or may include a suitable representation of the information. Block 108 of the method 100 comprises receiving the device property of the unidentified client device in response to the query. The device property may be received in some examples from the fingerprinting server, and may in some examples take any suitable format such as a REST response. The device property may indicate for example the device type, device manufacturer, device operating system, software installed on the device, version of operating system or software, and/or any other information describing the device or its capabilities. In some examples, the switch may actively query the fingerprinting server with extracted information (e.g. device fingerprint) and forward this information to the fingerprinting server instead of entire packets.

Therefore, in some examples, a network switch implementing the method 100 may act as an active collector of information and may actively query a fingerprinting server, without simply passively forwarding all communications to and/or from a particular device to the fingerprinting server. Furthermore, once the network switch receives the fingerprint information, e.g. in the form of a device properties, the network switch may in some examples forward no further information or communications relating to that device. The network switch may however do so in some examples, for example periodically or on a request from the fingerprinting server.

In some examples, once the device property has been received by the network switching device, the unidentified client device may be regarded as an identified device. As a result, the network switching device may send no further queries to the fingerprinting server in relation to that device, and may also stop retrieving information from communications to or from the device.

In some examples, the device property may be used by the network switching device to configure the network switching device. For example, the network switching device may configure a port to which the client device is connected or associated. In one example, the network switching device may configure a timeout (e.g. MAC ageout value) of a port to which the client device is connected. A timeout specifies a period of time whereby if no communications are received from the client device on the port, or sent to the client device through the port, during that period of time, the client is considered disconnected, disassociated or deauthenticated from the network switching device. Some client devices such as for example cameras may infrequently access the network (e.g. send or receive communications). In some examples, the network switching device may configure a longer timeout for certain device types such as cameras, such that they are less likely to be considered as disconnected, disassociated or deauthenticated under normal operating conditions. For example, a device may continue to communicate through the network after a period of silence without requiring reconnection or reauthentication. This port configuration may be performed automatically by the network switching device in some examples.

In some examples, the device property may be used by the network switching device to apply a policy based on the device property. For example, the network switching device may use the device property to determine how to handle traffic to or from the client device, such as the permitted bandwidth, permitted servers accessible by the client device, and/or any other traffic handling process. In some examples, the policy may be implemented automatically for the client device by the network switching device.

In another example usage scenario, a network may include multiple cameras for which the manufacturer has released a new firmware version. However, the new firmware version may include vulnerabilities that allow for malware attacks, and hence an entity (e.g. network controller) may require network access restrictions for camera device types, or at least cameras with the new firmware version. A fingerprinting server may therefore instruct switches in the network to gather information from devices (e.g. all devices, all cameras, or all cameras with the new firmware version) and to send associated queries to the fingerprinting server, and to receive device properties (e.g. the firmware version used by each device or camera) in return. The network switches may then enforce the more restricted network access for those cameras with the new firmware version. In some examples, the network switch may also receive an updated device profile as a response to a query to the fingerprinting server (e.g. the query based on the information), the device profile indicating more restricted network access for the cameras with the new firmware version. Although the device type being cameras is used as an example, this may be applied to any device type or any other device property.

Figure 2:
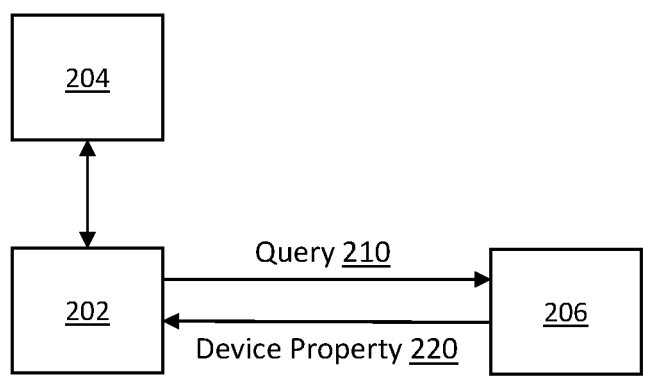
FIG. 2 is a schematic of an example of a network.

FIG. 2 shows a schematic of an example of a network 200. The network 200 includes a network switching device 202, which may in some examples implement the method 100 of FIG. 1, or the method 300 of FIG. 3 (described below). The network 200 also includes a client device 204 associated with or connected to the network switching device 202, and a fingerprinting server 206. In some examples, the network switching device 202 may retrieve information from communications to and/or from the client device 204, for example if the client device 204 is an unidentified client device, and may send a query 210 to the fingerprinting server 206 based on the information. The fingerprinting server 206 may respond with a device property 220 of the device that is derived from the information by the fingerprinting server 206.

Figure 3:
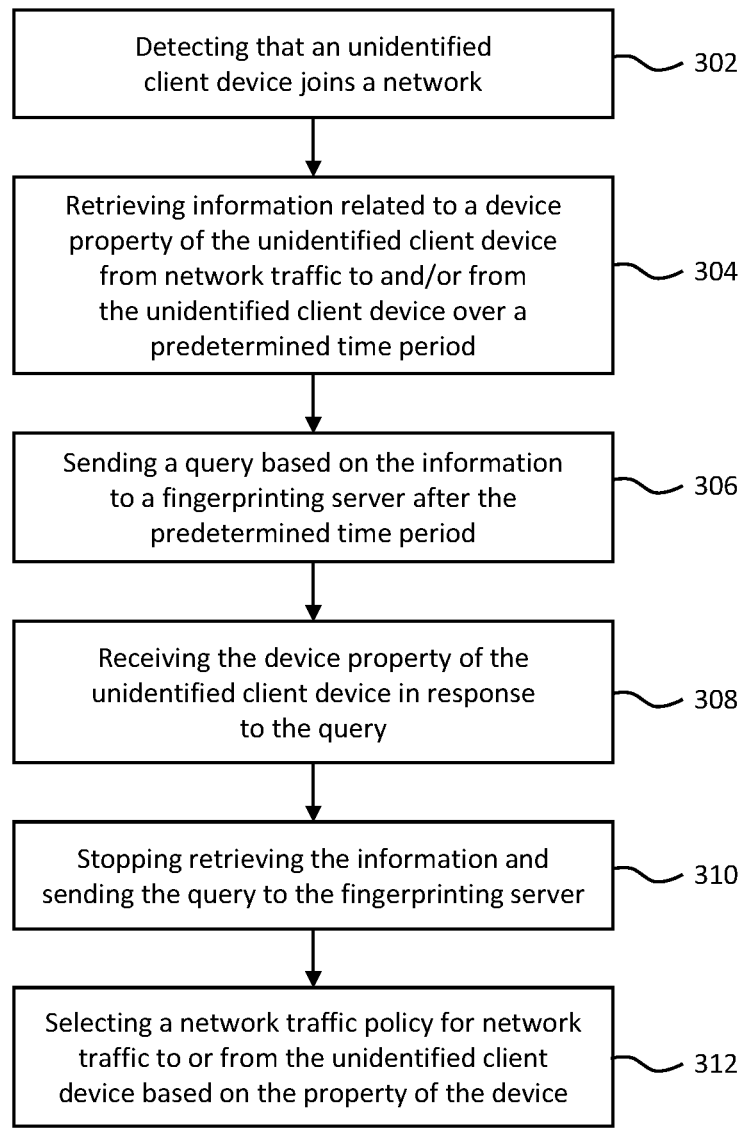
FIG. 3 is a flow chart of an example of a method in a network switching device.

FIG. 3 is a flow chart of an example of a method 300 in a network switching device. The network switching device may be, for example, the device 202 shown in FIG. 2. The method 300 comprises, in block 302, detecting that an unidentified client device (e.g. client device 204 shown in FIG. 2) joins a network and, in block 304, retrieving information related to a device property of the unidentified client device from network traffic to and/or from the unidentified client device over a predetermined time period. Next, in block 306, the method 300 comprises sending a query based on the information to a fingerprinting server (e.g. server 206 shown in FIG. 2) after the predetermined time period.

In some examples, the predetermined time period starts upon first detection of the unidentified client device. Therefore, for example, the network switching device may begin to retrieve the information as soon as it detects the client device (e.g. receives a communication from or sent to the client device). The network switching device may then obtain the device property from the fingerprinting server quickly.

Block 308 of the method 300 comprises receiving the device property of the unidentified client device in response to the query. Thus, in some examples, the network switch may gather information over the predetermined time period and subsequently send the query.

Block 310 of the method 300 comprises stopping retrieving the information and sending the query to the fingerprinting server. Therefore, these activities can be stopped for example once the network switching device knows the device property. In some examples, when the device property is known by the network switching device (for example, by caching responses from the fingerprinting server or otherwise storing information from the fingerprinting server), the network switching device considers the client device to be identified, and thus no longer needs to retrieve information and send a query to the fingerprinting server in relation to the client device.

Block 312 of the method 300 comprises selecting a network traffic policy for network traffic to or from the unidentified client device based on the property of the device. This may for example be done automatically by the network switching device. Thus the device property can be used to configure the network switching device with respect to the client device.

In some examples, the information extracted from the network traffic comprises a Dynamic Host Configuration Protocol (DHCP) Option Type-Length-Value (TLV), a DHCP Request, a HTTP header user agent string, a HTTP packet, a TCP SYN-ACK message header and/or a Link Layer Discovery Protocol (LLDP) frame.

In some examples, the device property comprises a type of the device, a manufacturer of the device, an operating system of the device, software installed on the device, a version of an operating system of the device, and/or a version of software installed on the device.

Figure 4:
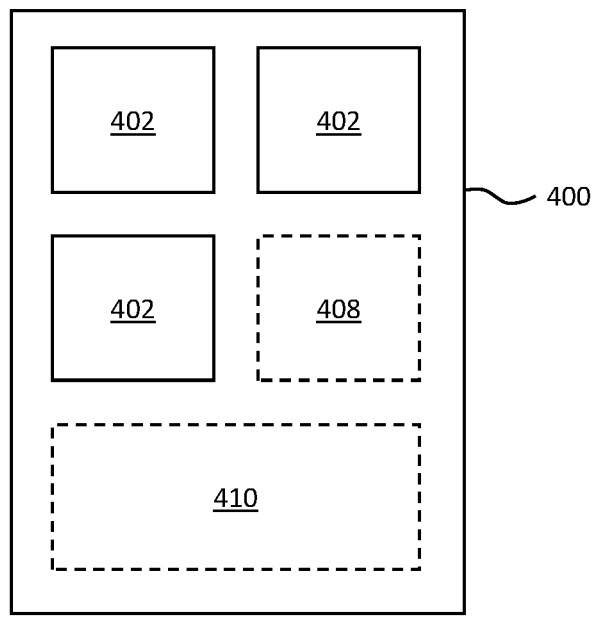
FIG. 4 is a schematic of an example of apparatus for determining a characteristic of a device.

FIG. 4 is a schematic of an example of apparatus 400 for determining a characteristic of a device. The apparatus 400 may in some examples be or be included in a network switch. The apparatus 400 comprises a communications switching module 402 to switch communications to and/or from the device. For example, for communications sent to the device, the communications switching module 402 may provide the communications to the device. For communications sent by the device, the communications switching module 402 may provide the communications to a appropriate network nodes.

The apparatus 400 also comprises a data acquisition module 404 to acquire information from the communications. The information may be information that can be used by a server, such as a fingerprinting server, to determine the characteristic of the device. The characteristic may be, for example, the device type, a manufacturer of the device, an operating system of the device, software installed on the device, a version of an operating system of the device, a version of software installed on the device, and/or any other device characteristic. The information acquired from the communications may be for example at least a Dynamic Host Configuration Protocol (DHCP) Option Type-Length-Value (TLV), a DHCP Request, a HTTP header user-agent string, a HTTP packet, a TCP SYN-ACK message header and/or a Link Layer Discovery Protocol (LLDP) frame.

The apparatus 400 also includes a characteristic determination module 406 to send the information to a server, such as for example a fingerprinting server, and to receive an identification of the characteristic of the device from the server in response. Once the apparatus 400 has received the device characteristic, the data acquisition module 404 may stop acquiring information from communications associated with the device, and the characteristic determination module 406 may no longer send queries to the server regarding the device.

In some examples, the apparatus 400 also includes a policy module 408 to apply, based on the characteristic of the device, a communications management policy to communications sent by or from the device. The policy module 408 is optional as illustrated by the dashed outline in FIG. 4. Therefore, for example, the apparatus 400 may manage communications sent to or from the device in accordance with a policy to be applied to a device having that characteristic or a particular fingerprint illustrated by that characteristic. This may be done for example automatically by the apparatus 400. The communications management policy may, in some examples, specify one or more of a VLAN to which certain devices should be assigned, an access policy (Access Control List, ACL), a Class of Service (CoS), Power Over Ethernet (POE) priority, ingress bandwidth, egress bandwidth, and/or any other aspect of communications management to be applied to devices with the property.

In some examples, the apparatus 400 also includes a configuration module 410 to configure properties of a port corresponding to the device based on the characteristic of the device. The configuration module 410 is optional as illustrated by the dashed outline in FIG. 4. The configuration module 410 may, for example, configure a timeout of the port based on the device characteristic, such as the device type, and/or may configure any other parameter of the port based on the characteristic. For example, cameras or other devices that are expected to communicate infrequently may be given a longer timeout than at least some other device types.

Figure 5:
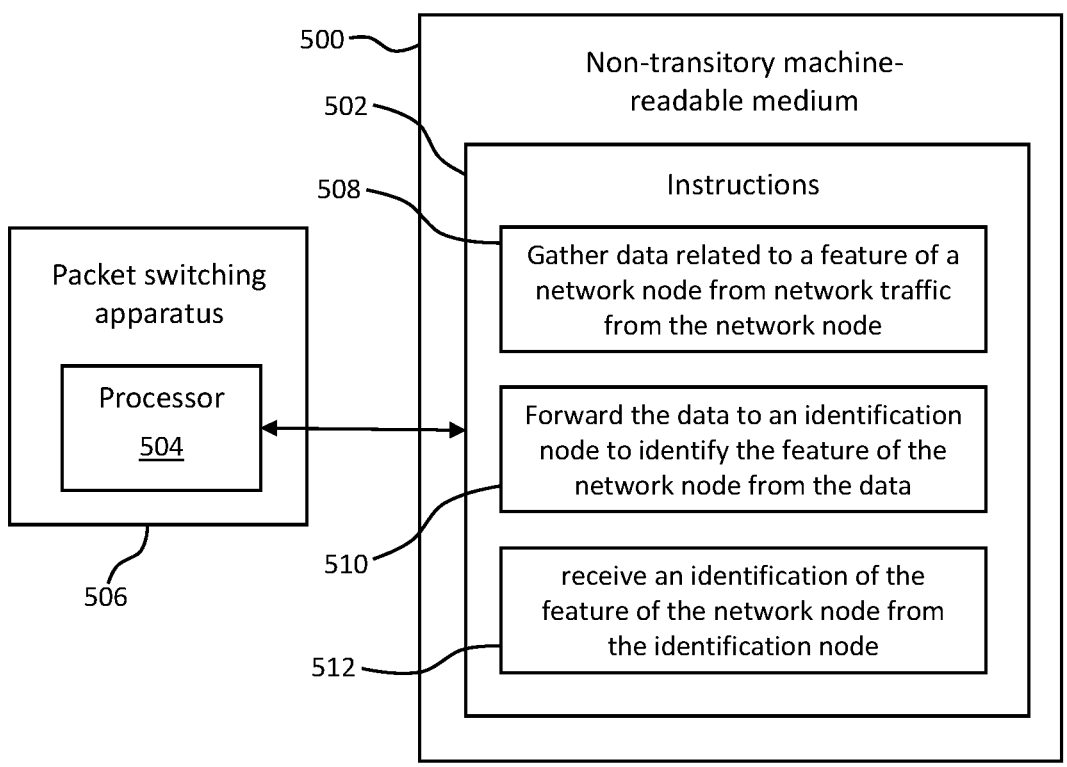
FIG. 5 is a schematic of an example of a machine-readable medium.

FIG. 5 is a schematic of an example of a non-transitory machine-readable medium 500 comprising instructions 502 that, when executed by a processor 504 in a packet switching apparatus 506, cause the processor 504 to gather 508 data related to a feature of a network node (e.g. a network end-client device) from network traffic from the network node, forward 510 the data to an identification node to identify the feature of the network node from the data, and receive 512 an identification of the feature of the network node from the identification node. In some examples, the feature may be, for example, the network node type, a manufacturer of the network node, an operating system of the network node, software installed on the network node, a version of an operating system of the network node, a version of software installed on the network node, and/or any other network node characteristic. The data gathered from the network traffic may be, for example, at least a Dynamic Host Configuration Protocol (DHCP) Option Type-Length-Value (TLV), a DHCP Request, a HTTP header user agent string, a HTTP packet, a TCP SYN-ACK message header and/or a Link Layer Discovery Protocol (LLDP) frame. The instructions 502 may for example be executed in a device that is or implements the features of a network switch.

In some examples, the instructions 502, when executed by the processor 504, cause the processor 504 to gather the data for a predetermined period of time and to forward the data to the identification node after the predetermined period of time.

In some examples, the instructions 502, when executed by the processor 504, cause the processor 504 to identify that the network node was not previously detected by the processor 504. For example, the MAC address of the network node was not previously seen by the network switch, or has not been seen by the network switch for a certain amount of time.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method performed by a network switching device, the method comprising:
   detecting, by the network switching device, that an unidentified client device joins a network, wherein the unidentified client device has not accessed the network within a threshold time period;
   extracting, by the network switching device, information related to a device property of the unidentified client device from network traffic to or from the unidentified client device;
   transmitting, by the network switching device, a query based on the information to a fingerprinting server;
   receiving, by the network switching device, the device property of the unidentified client device in response to the query;
   when the device property matches a particular type of device that infrequently joins the network, extending the threshold time period to correspond with a new threshold time period for the particular type of device, wherein the new threshold time period prevents the unidentified client device from requiring reconnection or reauthentication to the network on a subsequent attempt to join the network; and
   configuring a port of the network switching device based on the device property.

2. The method of claim 1, comprising selecting a network traffic policy for network traffic to or from the unidentified client device based on the device property.

3. The method of claim 1, wherein:
   extracting the information is performed over a predetermined time period; and
   sending the query to the fingerprinting server is performed after the predetermined time period.

4. The method of claim 3, wherein the predetermined time period starts upon first detection of the unidentified client device.

5. The method of claim 1, further comprising:
   after receiving the device property of the unidentified client device, stopping extracting the information and sending the query to the fingerprinting server.

6. The method of claim 1, wherein the information extracted from the network traffic comprises a Dynamic Host Configuration Protocol (DHCP) Option Type-Length-Value (TLV), a DHCP Request, a HTTP header user-agent string, a HTTP packet, a TCP SYN-ACK message header, or a Link Layer Discovery Protocol (LLDP) frame.

7. The method of claim 1, wherein the device property comprises a type of the unidentified client device, a manufacturer of the unidentified client device, an operating system of the unidentified client device, software installed on the unidentified client device, a version of an operating system of the unidentified client device, or a version of software installed on the unidentified client device.

8. The method of claim 1, wherein the unidentified client device is a temperature sensor.

9. The method of claim 1, wherein the device fingerprint is an operating system version.

10. The method of claim 1, wherein the information extracted from the network traffic is a Dynamic Host Configuration Protocol (DHCP) Option Type-Length-Value (TLV).

11. The method of claim 1, wherein the information extracted from the network traffic is a TCP SYN-ACK message header or a Link Layer Discovery Protocol (LLDP) frame.

12. The method of claim 1, wherein configuration of the port includes configuring a timeout of the port where the unidentified client device is connected.

13. An apparatus for determining a characteristic of an unidentified client device, the apparatus comprising:
   a memory; and
   a processor, wherein the processor is configured to execute instructions stored on the memory to perform the method comprising:
      detecting that the unidentified client device joins a network, wherein the unidentified client device has not accessed the network within a threshold time period;
      extracting information related to a device property of the unidentified client device from communications to or from the unidentified client device;
      transmitting a query based on the information to a fingerprinting server;
      receiving an identification of the characteristic of the unidentified client device from the fingerprinting server in a response;
      when the device property matches a particular type of device that infrequently joins the network, extending the threshold time period to correspond with a new threshold time period for the particular type of device, wherein the new threshold time period prevents the unidentified client device from requiring reconnection or reauthentication to the network on a subsequent attempt to join the network; and
      configuring a port based on the device property.

14. The apparatus of claim 13, wherein the apparatus comprises a network switch.

15. The apparatus of claim 14, further comprising: applying a policy based on the characteristic of the unidentified client device.

16. The apparatus of claim 14, further comprising: configuring a property of a port corresponding to the unidentified client device based on the characteristic of the unidentified client device.

17. The apparatus of claim 13, wherein the characteristic of the unidentified client device comprises a type of the unidentified client device, a manufacturer of the unidentified client device, an operating system of the unidentified client device, software installed on the unidentified client device, a version of an operating system of the unidentified client device, or a version of software installed on the unidentified client device.

18. A non-transitory machine-readable medium comprising instructions that, when executed by a processor in a packet switching apparatus, cause the processor to:
  gather data related to a feature of a network node from network traffic from the network node, wherein the network node has not accessed a network within a threshold time period;
  transmit the data to an identification node to identify the feature of the network node from the data, wherein the data is transmitted to the identification node using a query;
  receive an identification of the feature of the network node from the identification node in response to the query, wherein the device property is received in a response;
  when the device property matches a particular type of device that infrequently joins the network, extend the threshold time period to correspond with a new threshold time period for the particular type of device, wherein the new threshold time period prevents the unidentified client device from requiring reconnection or reauthentication to the network on a subsequent attempt to join the network; and
  configure a property of the packet switching apparatus based on the feature of the network node.

19. The machine-readable medium of claim 18, wherein the instructions, when executed by the processor, cause the processor to gather the data for a predetermined period of time and to forward the data to the identification node after the predetermined period of time.

20. The machine-readable medium of claim 18, wherein the instructions, when executed by the processor, cause the processor to identify that the network node was not previously detected by the processor within the threshold time period.

* * * * *